United States Patent [19]

Umehara et al.

[11] Patent Number: 4,888,506
[45] Date of Patent: Dec. 19, 1989

[54] VOICE COIL-TYPE LINEAR MOTOR

[75] Inventors: Teruo Umehara, Hanyu; Hiroyuki Daicho; Seiki Taketomi, both of Kumagaya, all of Japan

[73] Assignee: Hitachi Metals, Ltd., Tokyo, Japan

[21] Appl. No.: 216,042

[22] Filed: Jul. 7, 1988

[30] Foreign Application Priority Data

Jul. 9, 1987 [JP] Japan .................... 62-171899
Apr. 21, 1988 [JP] Japan .................. 63-53975[U]

[51] Int. Cl.$^4$ ............................. 402K 41/02
[52] U.S. Cl. ............................. 310/13; 310/44; 369/45
[58] Field of Search ............ 310/13, 44, 14; 369/43, 369/44, 45

[56] References Cited

U.S. PATENT DOCUMENTS

| | | | |
|---|---|---|---|
| 3,723,779 | 3/1973 | Gillum | 310/13 |
| 3,723,780 | 3/1973 | Gillum | 310/13 |
| 4,305,105 | 8/1981 | Ho | 360/106 |
| 4,780,226 | 10/1988 | Sheets et al. | 419/11 |
| 4,792,367 | 12/1988 | Lee | 419/12 |
| 4,797,866 | 1/1989 | Yoshikawa | 369/45 |

FOREIGN PATENT DOCUMENTS

| | | |
|---|---|---|
| 0101552 | 2/1984 | European Pat. Off. . |
| 0174735 | 3/1986 | European Pat. Off. . |
| 56-74077 | 6/1981 | Japan . |
| 60-153109 | 8/1985 | Japan . |
| 60-162745 | 8/1985 | Japan . |
| 61-87825 | 5/1986 | Japan . |
| 61-130453 | 6/1986 | Japan . |
| 61-150201 | 7/1986 | Japan . |
| 61-266056 | 11/1986 | Japan . |
| 61-210862 | 9/1986 | Japan . |

Primary Examiner—Patrick R. Salce
Assistant Examiner—Judson H. Jones
Attorney, Agent, or Firm—Finnegan, Henderson, Farabow, Garrett & Dunner

[57] ABSTRACT

A voice coil-type linear motor comprising an cylindrical outer yoke made of a ferromagnetic material; a cylindrical center yoke made of a ferromagnetic material and magnetically coupled with the outer yoke; an integral, cylindrical magnet consisting essentially of an R-B-Fe alloy wherein R is at least one of rare earth metals such as Nd, Pr and Dy and having magnetic anisotropy in a radial direction, the cylindrical magnet being fixed to an inner surface of the outer yoke; a protective member made of a nonmagnetic and conductive material and fixed to a surface of the cylindrical magnet; and a movable coil means arranged in a magnetic gap between the center yoke and the cylindrical magnet.

10 Claims, 1 Drawing Sheet

VOICE COIL-TYPE LINEAR MOTOR

BACKGROUND OF THE INVENTION

The present invention relates to a voice coil-type linear motor used as a means for positioning a magnetic head in a magnetic disk drive, etc.

A voice coil-type linear motor has a simple structure and is excellent as a power source of high-speed linear motion, so it is used in a large varieties of applications. Particularly, in a magnetic disk drive, it is necessary that a magnetic head moves from one track position to another on a magnetic disk at high speed and with high accuracy. Therefore, as a means for positioning a magnetic head, a voice coil-type linear motor having shorter access time than other motors is widely used.

Generally, a voice coil-type linear motor is constituted by a cylindrical outer yoke, a center yoke, a permanent magnet fixed to an inner surface of the outer yoke and a movable coil(see, for instance, U.S. Pat. Nos. 3,723,779, 3,723,780 and 4,305,105).

The permanent magnets for such a motor are usually Alnico magnets, ferrite magnets, rare earth cobalt magnets, etc. In a voice coil-type linear motor, the thickness of a permanent magnet is restricted such that its operating point cannot be made high(generally, its permeance coefficient is 0.8-3 or so, which may vary depending upon the magnetic circuit structure). Accordingly, it has been necessary to use ferrite magnets or rare earth cobalt magnets having high coercive force. Particularly, since voice coil-type linear motors are required to be smaller and have higher performance with the miniaturization and increase in performance of magnetic disk drives, rare earth cobalt magnets have been widely used(see for instance, Japanese Patent Laid-Open No. 56,74077).

Recently, because of the demand for higher magnetic flux density in the magnetic gap in a voice coil-type linear motor, rare earth-iron-boron (R-Fe-B) permanent magnets have become widely used in such a voice coil-type motor or a linear motor (European Patent Publication 0 101 552, Japanese Patent Laid-Open Nos. 61-210862 and 61-266056).

However, when an R-Fe-B rare earth permanent magnet is incorporated into a voice coil-type linear motor, conventionally a large number of arc magnet segments are used, and these magnet segments are bonded to an inner wall of an outer cylindrical yoke to form a cylindrical magnet. However, this entails a high cost. And when a plurality of arc magnet segments are bonded to form an integral cylindrical magnet, the magnetic flux density in the magnetic gap of a magnetic circuit fluctuates by about 8–10% because adjacent magnet segments are bonded to each other with some circumferentially extensive radial bonding areas for ensuring a sufficient bonding strength. Therefore, the movement of the movable coil has limited accuracy.

In addition, since an R-Fe-B rare earth permanent magnet contains large amounts of rare earth elements(-particularly, Nd) and iron which are easily oxidizable in the air, the magnet is likely to be covered by an oxide layer on the surface when used in a magnetic circuit, leading to a decrease in the magnetic flux density in a gap. Therefore, in a case for using an R-Fe-B permanent magnet, it is usual to form an anti-oxidizing layer on the surface by various methods(see, for instance, Japanese Patent Laid-Open Nos. 60-153109, 61-130453, 61-150201, etc.). However, since a magnetic gap is as narrow as few millimeters in a voice coil-type linear motor, the magnet is likely to be chipped by contact with a coil when it is assembled in the motor, even though the magnet is covered with an anti-oxidizing layer on the surface. Accordingly, assembling effiency was conventionally sacrificed to prevent the chipping of the magnet.

OBJECT AND SUMMARY OF THE INVENTION

Therefore, an object of the present invention is to provide a voice coil-type linear motor having high performance and easy to assemble.

Thus, the voice coil-type linear motor according to the present invention comprises an cylindrical outer yoke made of a ferromagnetic material; a cylindrical center yoke made of a ferromagnetic material and magnetically coupled with said outer yoke; an integral, cylindrical magnet consisting essentially of an R-B-Fe alloy wherein R is at least one of rare earth metals such as Nd, Pr and Dy and having magnetic anisotropy in a radial direction, said cylindrical magnet being fixed to an inner surface of said outer yoke; a protective member made of a nonmagnetic and conductive material and fixed to a surface of said cylindrical magnet; and a movable coil means aranged in a magnetic gap between said center yoke and said cylindrical magnet.

DETAILED DESCRIPTION OF THE INVENTION

Figure 1:
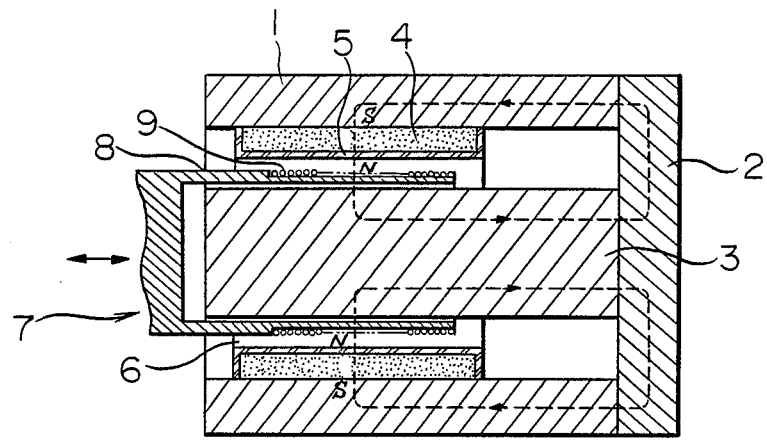
FIG. 1 is a cross-sectional view showing a voice coil-type linear motor according to one embodiment of the present invention.
Figure 2:
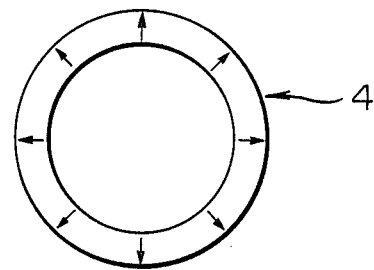
FIG. 2 is a plan view showing a cylindrical magnet used in the present invention.

Referring to FIG. 1, a voice coil-type linear motor according to one embodiment of the present invention comprises a cylindrical outer yoke 1, a rear yoke 2 and a center yoke 3, any of which may be made of ferromagnetic materials such as soft iron, steel, etc. Incidentally, the center yoke 3 may be in the form of a hollow cylinder, though it is shown as a solid cylinder in FIG. 1. The rear yoke 2 is fixed to one end of the outer yoke 1, and fixed to a center of the rear yoke 2 is a center yoke 3 arranged concentrically with the outer yoke 1. Fixed to an inner wall of the outer yoke 1 is an integral, cylindrical magnet 4 made of an R-Fe-B permanent magnet and having magnetic anisotropy in a radial direction(see FIG. 2).

To avoid fluctuation of the surface magnetic flux density (Bg) in a radial direction, this cylindrical magnet 4 should have no bonded portion in the circumferential direction. Incidentally, axially bonded portions may cause substantially no problems with respect to the performance of the motor, such as linearity of its driving force. Particularly, when the magnet is considerably long, it is practically difficult to produce a long, cylindrical magnet with good structural accuracy (circularity, linearity, etc.) because of the difficulty of forming, the shrinkage and deformation by sintering (usually shrinkage is about 14–16%), and the limitiation of magnetization. Therefore, when the magnet is very long, a plurality of short, annular magnets can be axially bonded to the desired length. Thus, the term "integral" used herein means that the magnet does not have any bonded portion in a circumferential direction, and that it may have some bonded portions in an axial or radial direction. Further, the magnet may be formed with an anti-oxidizing layer on the surface.

A protective member 5 made of nonmagnetic and conductive materials such as metal materials like Cu, Al or their alloys is attached to the surface of the cylindrical magnet 4 except for its portions being in contact with the outer yoke 1. A magnetic gap 6 is defined between the center yoke 3 and the cylindrical magnet 4. Arranged in the magnetic gap 6 is a voice coil 7 connected to a carriage supporting a magnetic head(not shown). The voice coil 7 is constituted by a coil 9 wound around a bobbin 8 made of an insulating material such as plastic.

In the voice coil-type linear motor of this structure, when current flows in the coil 9 of the voice coil 7, the voice coil 7 moves linearly by Fleming's left-hand rule because the lines of magnetic flux generated by the cylindrical magnet 4(shown by broken lines in FIG. 1) are perpendicular to the electric current. Since the direction of the movement of the voice coil 7 can be reversed by changing the direction of electric current, the voice coil can move back and forth.

In the present invention, since an integral cylindrical magnet made of an R-Fe-B magnet and having magnetic anisotropy in the radial direction is used as the permanent magnet for generating magnetic flux, the magnetic flux density in the magnetic gap (hereinafter referred to "Bg") is high and the number of steps for assembling the motor can be dramatically reduced. Particularly, since the integral, cylindrical magnet having no bonded portions in a circumferential direction is used in the present invention, the magnetic flux density in the magnetic gap is stable in a radial direction whereby the accuracy of the movement of the movable coil is dramatically improved.

Incidentally, if an anisotropic, cylindrical magnet is made of an R-Co magnet material, it would suffer from cracking because it does not have sufficient mechanical strength to withstand a residual stress generated by giving anisotropy to the magnet. On the other hand, the R-Fe-B magnet has high mechanical strength because it contains a large amount of Fe, and so it is resistant to cracking even though it is made anisotropic. In other words, by manufacturing a radially isotropic, cylindrical magnet of an R-Fe-B magnet material, a practically usable magnet can be obtained. In addition, the R-Fe-B magnet is highly orientable because it contains a large amount of Fe, meaning that it is much easier to provide anisotropy than ferrite magnets. Accordingly, the R-Fe-B magnet can have a high magnetic flux density. Consequently, the radially anisotropic, cylindrical R-Fe-B magnet has much higher mechanical and magnetic properties than magnets such as SmCo magnets and ferrite magnets (conventionally used for motors).

Since the R-Fe-B magnet has such excellent magnetic properties, it can provide a high magnetic flux density in the gap when used in a voice coil-type linear motor. Further, when a high magnetic flux density is required in the gap, a plurality of integral, cylindrical R-Fe-B magnets can be laminated radially. For instance, when a linear motor has an R-Fe-B cylindrical magnet of two-layer structure, it has a gap magnetic flux density 20% higher than a linear motor having a single-layer cylindrical magnet.

Particularly, since the permanent magnet is covered by a protective member in the present invention, the magnet is not likely to be cracked even when the magnet and the coil happen to come into contact with each other in the assembling of a motor. Since this protective member is made of a nonmagnetic, conductive material, the variation of the inductance of the voice coil during strokes can be compensated. Specifically speaking, when the voice coil is energized, eddy current flows on the surface of the center yoke, causing a variation of the inductance of the voice coil. However, the eddy current flows more easily in the protective member because it has lower permeability and higher conductivity than the center yoke, so the variation of the inductance of the voice coil during strokes can be suppressed. Therefore, a conventional compensation ring need not be mounted to the surface of the center yoke. Incidentally, the protective member needs only to have a thickness of 0.5–3 mm when it is made of Cu, to take the place of a short compensation ring.

The driving force of the voice coil it proportional to Bg when an effective length of the coil and input current are constant. Therefore, it is necessary to incrase Bg to provide higher motor performance. For this purpose, it is desired that the permanent magnet has high magnetic properties at its operating point.

Here, Bg may vary with the permeance coefficient of the magnetic circuit. For instance, the permeance coefficient is conventionally about 2–3, and in this case Bg is 6–7 kG for an $SmCo_5$ magnet, 8–9 kG for an Nd-Fe-B magnet. However, since the thickness of the magnet is reduced for miniaturization of the motor, the permeance coefficient is reduced to about 0.8–1.5. In the case of such a low permeance coefficient, Bg is about 3.5 kG for an SmCo magnet and 4–5 kG for an R-Fe-B magnet. Particularly, in the case of an R-Fe-B magnet, the energy of the magnet, proportional to its energy product, can be most efficiently utilized when the permeance coefficient is 1–1.2. Thus, it is desirable to design a magnetic circuit so that the permeance coefficient is in this range.

Since the magnetic properties of the permanent magnet are determined basically by its composition, the following composition is desired in order to have high magnetic properties.

As the rare earth elements R used in the present invention, there are ordinarily used light rare earth elements such as Nd and Pr, and Nd is used most ordinarily because it is abundant as a natural resource and inexpensive. For the purpose of the improvement of coercive force and heat resistance, for example, part (1–30%) of R can be replaced by heavy rare earth elements such as Dy, Ho and Tb. R can further contain at least one member selected from La, Ce, Sm, Gd, Er, Eu, Tm, Tb and Y. The content of the rare earth elements is desirably in the range of 10–30 atomic %. When R is less than 10 atomic %, the resulting cylindrical permanent magnet has low magnetic properties, particularly a low coercive force, and when R is more than 30 atomic %, the cylindrical permanent magnet contains an R-rich, nonmagnetic phase in a large amount, which leads to low residual magnetic flux density.

The content of B in the cylindrical permanent magnet of the present invention is desirably in the range of 2–28 atomic %. When B is less than 2 atomic %, the resulting magnet has a low coercive force, and when B is greater than 28 atomic %, the magnet contains a B-rich, nonmagnetic phase in a large amount and has a low residual magnetic flux density.

The content of Fe is desirably in the range of 65–80 atomic %. When Fe is less than 65 atomic %, the magnet has a low residual magnetic flux density, and when Fe is more than 80 atomic %, the magnet has a low coercive force.

The cylindrical permanent magnet of the present invention may contain, in addition to the above-mentioned essential components, impurities (e.g. $O_2$) which inevitably come into existence through the production process. The cylindrical permanent magnet of the present invention can further contain additive elements (e.g. Co, Al, Ti, etc.) which are commonly used in R-Fe-B magnets. Magnets containing the above additive elements are disclosed in Japanese Patent Laid-Open Nos. 60-162754 and 61-87825.

The cylindrical permanent magnet according to the present invention is typically produced as follows.

First, the production of a molten R-Fe-B alloy is conducted in an Ar atmosphere or in vacuum according to a known method. It is possible to use ferroboron in place of B. Preferably, the rare earth elements R are added last.

Pulverizing of the resulting alloy consists of two steps, namely, coarse pulverizing and fine pulverizing. The coarse pulverizing is conducted by a stamp mill, a jaw crusher, a Brown mill, a disk mill or the like, and the fine pulverizing is conducted by a jet mill, a vibration mill, a ball mill or the like. Each pulverizing is conducted in a non-oxidizing atmosphere in order to avoid the oxidation of the resulting powder. Therefore, the use of an organic solvent or an inert gas is preferable. The particle size of the powder obtained is preferably 2–5 $\mu$m (measured by Fischer Subsieve Sizer).

Figure 3:
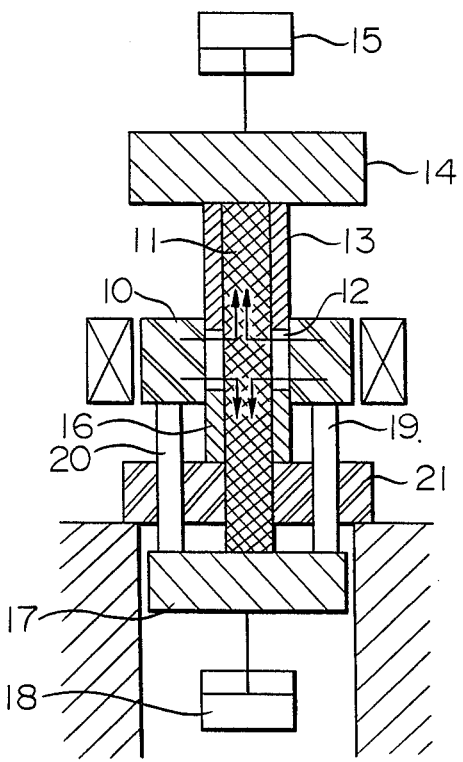
FIG. 3 is a schematic cross-sectional view showing an apparatus for manufacturing a cylindrical magnet used in the present invention.

Compacting of the magnetic powder obtained is conducted using an apparatus shown in FIG. 3. The compacting apparatus has a die 10 made of a magnetic material and a core 11 made of a magnetic material and concentrically provided in a columnar space defined by the die 10. The die 10 is supported by supports 19 and 20, and the core 11 and the supports 19 and 20 are supported by a lower frame 17. Into an annular cavity 12 between the die 10 and core 11 are fitted a cylindrical upper punch 13 made of a non-magnetic material and a cylindrical lower punch 16 made of a non-magnetic material. A cylindrical cavity 12 is defined by the die 10, the core 11, the upper punch 13 and the lower punch 16. Arranged around the die 10 is a magnetizing coil 22 for supplying a radial magnetic field into the cavity 12. The lower punch 16 is fixed to a base 21 and the upper punch 13 is fixed to an upper frame 14. The upper frame 14 and the lower frame 17 are connected to an upper hydraulic cylinder 15 and a lower hydraulic cylinder 18, respectively.

Next, the production of a cylindrical permanent magnet using the compacting apparatus of FIG. 3 is described.

In a state that the upper punch 13 is lifted, Nd-Fe-B alloy powder is charged into the cavity 12 by a feeding means (not shown) such as a vibration feeder or the like. Then, the Nd, Fe-B alloy powder is pressed while flowing electric current to the coil 22. The magnetic fluxes generated by the coil 22 flow through the die 10, the cavity 12 and the core 11, so the resulting cylindrical green body has the magnetic powder radially oriented. In this case, the magnetic field generated is desirably in the range of 5–25 kOe. The compacting pressure is 500–2,000 kg/cm$^2$. After compression, electric current of opposite direction is passed through the coil 22, whereby the green body is demagnetized. Thereafter the green body is taken out of the die.

The green body is then sintered. This sintering is conducted in an inert gas such as Ar, He or the like, or in vacuum, or in hydrogen at 950°–1,150° C. for 20 minutes to 2 hours.

After sintering, the sintered body is given, if necessary, an appropriate heat treatment in an inert gas atmosphere. Preferable heat treatment conditions are 500°–700° C. and 30 minutes-3 hours.

Finally, the sintered body is magnetized in the same direction as the orientation direction of the magnetic powder. The magnetization strength is desirably in the range of 5–30 kOe. The magnetization is generally conducted in a magnetic circuit having substantially the same permeance coefficient as that of the motor. Incidentally, when the permeance coefficient is 1 or less, there is no difference in permenace coefficient between the magnetization after assembling and that before assembling. Accordingly, the cylindrical magnet can be magnetized before assembling.

EXAMPLE 1, COMPARATIVE EXAMPLE 1

An alloy consisting essentially of 13 atomic % of Nd, 2 atomic % of Dy, 7 atomic % of B and 78 atomic % of Fe was prepared by means of vacuum melting. The alloy was then subjected to coarse pulverizing and fine pulverizing in this order in an $N_2$ gas atmosphere to obtain an alloy powder having an average particle size of 3 $\mu$m.

The alloy powder was subjected to compacting in the apparatus shown in FIG. 3 at a pressure of 1,000 kg/cm$^2$ while applying a pulse magnetic field of 20 kOe. The resulting green body was sintered in vacuum at 1,100° C. for 2 hours. The resulting sintered body was heat-treated in an Ar gas atmosphere at 600° C. for 1 hour. Thereafter, the outer surface of the sintered body was ground and magnetized, whereby a cylindrical permanent magnet having an outer diameter of 99 mm and an inner diameter of 92 mm and a length of 23 mm was obtained. The cylindrical magnet had Br=11,000 G, iHc=10,000 Oe, and (BH)max=26 MGOe.

Three cylindrical magnets thus obtained were bonded to each other axially and assembled in the magnetic circuit shown in FIG. 1. Each yoke was made of soft iron, and the outer yoke had an outer diameter of 117 mm, the center yoke had an outer diameter of 84 mm and an inner diameter of 60 mm. And the surface of the magnet was covered by a copper plate of 1.0 mm thick.

For comparison, the same magnetic circuit except for the copper plate was assembled by using 36 magnet blocks having the same composition as above without using a copper plate, each magnet block being nickel-plated to a thickness of 10 $\mu$m.

These magnetic circuits were measured with respect to gap magnetic flux density (Bg). As a result, the measure Bg was 4,200 G for the magnetic circuit of the present invention and 3500 G for the conventional one. Further, though Bg varied 10% in the circumferential direction in the conventional magnetic circuit, there was substantially no variation of Bg in the magnetic circuit of the present invention. In addition, the linear motor of the present invention could be assembled by 40% fewer steps than the conventional one.

Their gap magnetic flux densities were measured after being left in the atmosphere at 80° C. and 90% R.H. for one week. As a result, Bg was 3,900 G for the present invention and 3200 G for the conventional one, which means that the product of the present invention is superior to the conventional one in environmental durability.

EXAMPLE 2

A cylindrical magnet of 100 mm outer diameter, 92 mm inner diameter and 24 mm in length was produced under the same conditions as in Example 1 except for using an alloy having a composition of $Nd_{0.90}Dy_{0.10}$-$(Fe_{bal}B_{0.08}Nb_{0.015})_{5.4}$. This magnet had magnetic properties: Br=11,000 G, iHc=20,000 Oe, and (BH)max=27 MGOe.

After surface-treating the above cylindrical magnet by forming a 20-μm-thick epoxy resin coating by an electrodeposition method, three cylindrical magnets were axially bonded (total length: 72 mm) and then assembled in the magnetic circuit of FIG. 1. Each yoke was made of soft iron, and the outer yoke had an outer diameter of 117 mm and an inner diameter of 101 mm. The center yoke had an outer diameter of 84 mm and an inner diameter of 60 mm. The surface of the magnet was covered by a copper plate of 1.0 mm in thickness.

This magnetic circuit had Bg of 4,600 G, and there was substantially no variation of Bg in a circumferential direction. After leaving this magnetic circuit in the atmosphere at 80° C. abd 90% R.H. for 1 week, its Bg was 4,500 G, which means it had excellent environmental durability. Incidentally, the number of steps of assembling this magnetic circuit was only 70% of that of the conventional one.

EXAMPLE 3

A voice coil motor was manufactured by using the magnetic circuit obtained in the above Examples, and the performance of each motor was evaluated. The results are shown in Table 1.

TABLE 1

| Sample | Maximum Driving Force (kgf/A) | Time Const. (ms) | Bg (G) | Gap Length (mm) |
|---|---|---|---|---|
| Example 1 | 1.91 | 1.5 | 4200 | 4 |
| Example 2 | 2.05 | 1.65 | 4500 | 4 |
| Comparative Example 1 | 1.6 | 2.2 | 3500 | 4 |

Note:
Coil: Aluminum rectangular wire (width: 1 mm, thickness: 0.3 mm), 163 turns, length 30 mm
Input current: 1 A
Stroke: 38.7 mm

EXAMPLE 4

Three inner magnets and three outer magnets having the following sizes were prepared in the same manner as in Example 2.

Inner magnet: Outer diameter 96 mm, inner diameter 90 mm, length 24 mm.
Outer magnet: Outer diameter 106 mm, inner diameter 96 mm, length 24 mm.

Each magnet was coated with a 20-μm-thick epoxy resin layer by an electrodeposition method, and the inner magnet and the outer magnet were bonded. Thereafter, the three assembled magnets were axially bonded and then assembled into the linear motor shown in FIG. 1. Here, the outer yoke had an outer diameter of 122 mm, and the center yoke had an outer diameter of 82 mm and an inner diameter of 58 mm. Both yokes were made of soft iron. Next, a protective member of 1.0 mm in thickness was produced by a copper plate and fixed to the surface of the magnet.

As a comparative example having a conventional structure, the following linear motor was manufactured. First, magnet blocks having the same compositions as above and prepared by pressing in a parallel magnetic field were machined to provide arcuate magnet segments (central angel 30°). Each arc segment was nickel-plated to a thickness of 10 μm. 12 of these magnet segments were arranged in a cylindrical shaped and bonded to an inner wall of the outer yoke.

For both linear motors, Bg was measured. As a result, it was 4,800 G on average in a circumferential direction for the conventional one, and there was 10% variation of Bg in the circumferential direction. On the other hand, it was 6,000 G for the linear motor of the present invention, and there was substantially no variation of Bg in a circumferential direction.

After leaving both linear motors in the atmosphere at 80° C. and 90% R.H. for 1 week, Bg was measured. As a result, it was observed that Bg deceased to 4,500 G for the conventional one, while there was substantially no decrease in Bg for the linear motor of the present invention. This means that the linear motor of the present invention had excellent environmental durability.

As described above in detail, the voice coil-type linear motor of the present invention comprises an integral, cylindrical R-Fe-B magnet having radial anisotropy and assembled in a magnetic circuit and further covered by a nonmagnetic, conductive, protective member. Therefore, it has high performance and can be assembled by reduced number of steps.

The present invention has been described by the above Examples, but it should be noted that any modifications can be made unless they deviate from the scope of the present invention defined by the claims attached hereto.

What is claimed is:

1. A voice coil-type linear motor comprising an cylindrical outer yoke made of a ferromagnetic material; a cylindrical center yoke made of a ferromagnetic material and magnetically coupled with said outer yoke; a circumferentially integral, cylindrical magnet consisting essentially of an R-B-Fe alloy wherein R is at least one of the rare earth metals such as Nd, Pr and Dy and having magnetic anisotropy in a radial direction, said cylindrical magnet being fixed to an inner surface of said outer yoke; a movable coil means arranged in a magnetic gap between said center yoke and said cylindrical magnet; and combined means for protecting said cylindrical magnet against physical contact-induced cracking and for compensating for the variation in inductance of said movable coil means during motor operation.

2. A voice coil-type linear motor comprising an cylindrical outer yoke made of a ferromagnetic material; a cylindrical center yoke made of a ferromagnetic material and magnetically coupled with said outer yoke; a circumferentially integral, cylindrical magnet consisting essentially of 10-30 atomic % of R wherein R is at least one of the rare earth metals such as Nd, Pr and Dy, 2-28 atomic % of B and 65-80 atomic % of Fe and having magnetic anisotropy in a radial direction, said cylindrical magnet being coated with an anti-oxidizing layer and fixed to an inner surface of said outer yoke; a movable coil means arranged in a magnetic gap between said center yoke and said cylindrical magnet; and combined means for protecting said cylindrical magnet against physical contact-induced cracking and for compensating for the variation in inductance of said movable coil means during motor operation.

3. The voice-coil type linear motor as in claim 1 wherein said protecting and compensating means includes a member made of a nonmagnetic and conductive material, having an operative thickness, and fixed to a surface of said cylindrical magnet.

4. The voice-coil type linear motor as in claim 3 wherein said protective member is copper and has a thickness of about 0.5–3 mm.

5. The voice-coil type linear motor as in claim 1 wherein said circumferentially integral cylindrical magnet includes a plurality of circumferentially integral axial segments.

6. The voice-coil type linear motor as in claim 1 wherein said circumferentially integral cylindrical magnet includes a plurality of circumferentially integral radial segments.

7. The voice-coil type linear motor as in claim 2 wherein said protecting and compensating means includes a member made of a nonmagnetic and conductive material, having an operative thickness, and fixed to a surface of said cylindrical magnet.

8. The voice-coil type linear motor as in claim 2 wherein said protective member is copper and has a thickness of about 0.5–3 mm.

9. The voice-coil type linear motor as in claim 3 wherein said circumferentially integral cylindrical magnet includes a plurality of circumferentially integral axial segments.

10. The voice-coil type linear motor as in claim 3 wherein said circumferentially integral cylindrical magnet includes a plurality of circumferentially integral radial segments.

* * * * *